United States Patent [19]

Kemp

[11] Patent Number: 4,530,488
[45] Date of Patent: Jul. 23, 1985

[54] THROUGH CONDUIT GATE VALVE WITH DOUBLE EXPANDING GATE ASSEMBLY

[76] Inventor: Willard E. Kemp, One Riverway, Suite 2420, Houston, Tex. 77056

[21] Appl. No.: 510,638

[22] Filed: Jul. 5, 1983

[51] Int. Cl.³ ............................................ F16K 25/00
[52] U.S. Cl. .................................. 251/167; 251/196; 251/199
[58] Field of Search ................ 251/167, 168, 196, 199

[56] References Cited

U.S. PATENT DOCUMENTS

| | | | |
|---|---|---|---|
| 2,583,512 | 1/1952 | Laurent | 251/196 |
| 2,749,083 | 6/1956 | Fennema | 251/167 |
| 2,855,175 | 10/1958 | Dunbar | 251/196 |
| 2,906,491 | 9/1959 | Young | 251/167 |
| 3,006,601 | 10/1961 | Anderson | 251/196 |
| 4,179,099 | 12/1979 | Pierce | 251/168 |
| 4,188,014 | 2/1980 | Alvarez | 251/196 |
| 4,188,016 | 2/1980 | Whaley | 251/167 X |
| 4,279,404 | 7/1981 | Levin | 251/196 X |
| 4,291,862 | 9/1981 | Alvarez | 251/167 |
| 4,341,369 | 7/1982 | Meyer | 251/168 |

Primary Examiner—Harold W. Weakley
Attorney, Agent, or Firm—Vaden, Eickenroht, Thompson & Jamison

[57] ABSTRACT

An improved through conduit gate valve having a double expanding gate assembly with floating seats. The gate assembly carries at its edges flat guide strips which are slightly thicker than the collapsed thickness of the gate. These strips engage the seals to keep them from blinding or back wedging the gate assembly during movement between its opened and closed positions. Elastic suspension elements mount the strips to the gate assembly for proper wedging action by expansion against the seals but insures return into the collapsed position during the mentioned movement.

7 Claims, 8 Drawing Figures

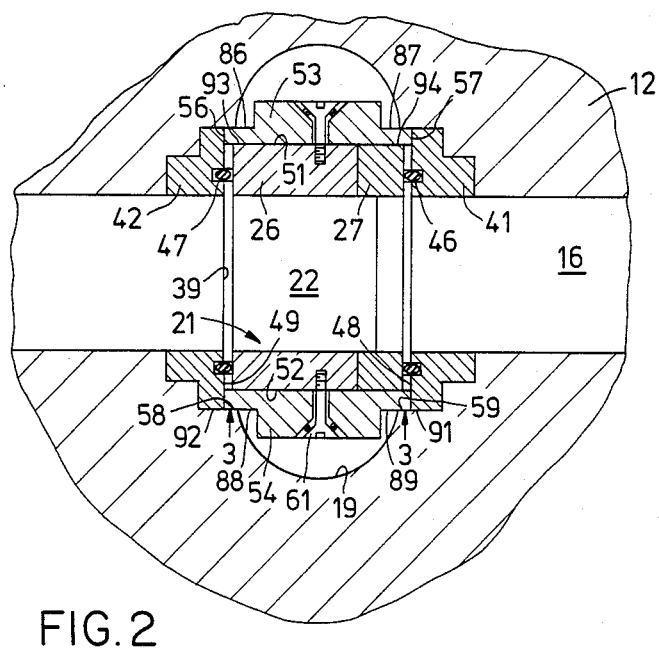
FIG. 2
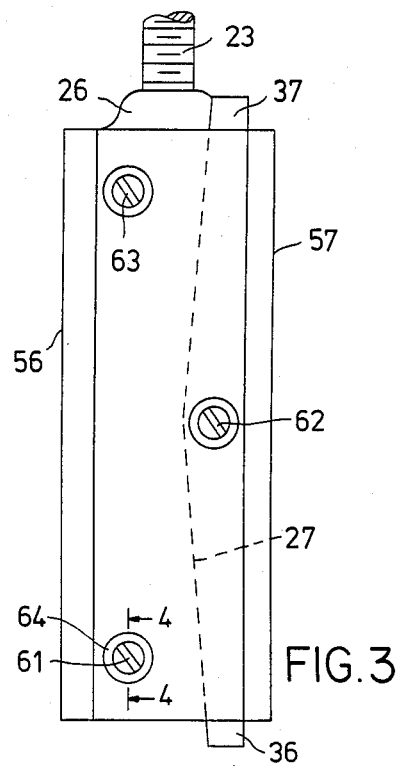
FIG. 3
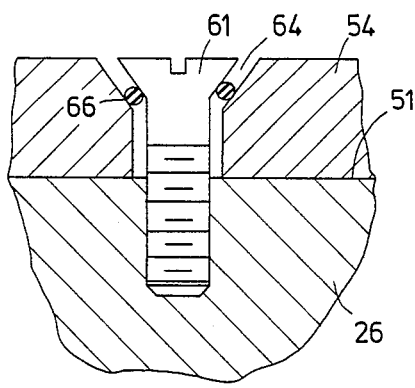
FIG. 4
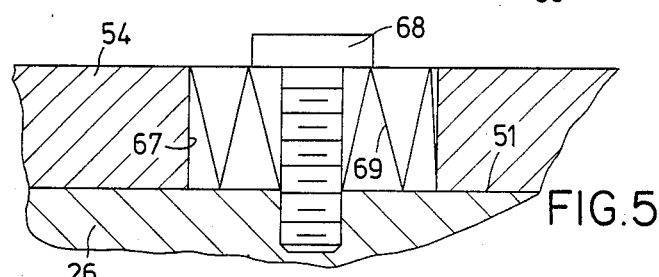
FIG. 5
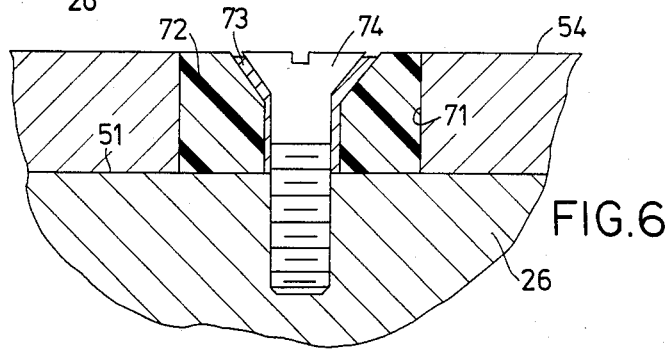
FIG. 6
FIG. 8
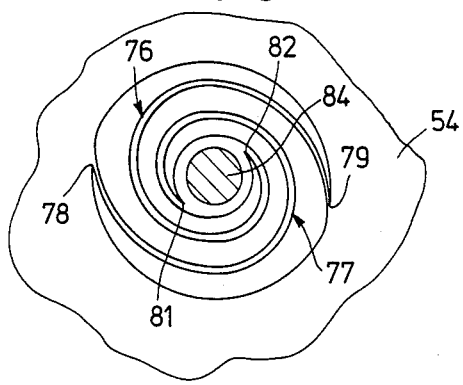
FIG. 7

THROUGH CONDUIT GATE VALVE WITH DOUBLE EXPANDING GATE ASSEMBLY

BACKGROUND OF THE INVENTION

1. Field of the Invention

This invention relates to valves of the type for controlling wellhead flows, and it more particularly relates to through conduit gate valves with a double expanding gate assembly and floating seals.

2. Description of the Prior Art

There have been many designs of through conduit gate valves with expanding gate assemblies to insure that the wedging action of such gate elements did not occur while the valve was being adjusted between opened and closed positions. Further, it has been essential that the wedging action did occur at the opened and closed positions for providing the fluid sealing function of these valves.

The gate assembly comprises a gate member or element and segment having smooth parallel faces for engaging metal backed sealing rings. The gate element has a vee recess engaged by a complementary vee face on the segment. Axial movement between the gate element and segment causes the expansion for engaging the seals at the closed and opened positions. The gate element and segment are brought into their collapsed position while the gate assembly is moving between opened and closed positions. If the gate assembly does not remain in its collapsed position and it is moved relative to the seals, the resilient sealing rings are quickly destroyed, and also, serious injury can occur to other parts of the valve. These problems can be termed binding or back wedging.

In order to insure bringing the gate assembly into collapsed condition during movement relative to the seals, various spring biasing arrangements have been proposed. There are sophisticated theories as to the angular inclination of the vee faces in the gate assembly and spring configurations and bending characteristics to promote reaching the collapsed condition during movement of the gate assembly.

Unfortunately, these high technology arrangements of spring biasing fail when the seals "float" inwardly against the gate assembly and cause binding problems. In some gate valves, the seals are mounted in recesses with piston like clearances, and carry resilient sealing rings engaging the valve body. The fluid pressure in the conduit can force these seals inwardly against the gate. Debris, corrosion or other causes, can hold the seals in this inward position. Naturally, moving a wedging type gate against the "binding" of these seals causes sufficient drag that the conventional gate assembly cannot be returned into the collapsed condition during movement between opened and closed positions.

In other gate valves, the seals are pressed firmly into the recesses in the body. Generally, these seals are not rigidly secured in the recesses, but suffer some movement or rocking from reaction to gate assembly movements. If the seals move or float inwardly a sufficient distance to engage or wedge against the gate assembly, the resultant drag or frictional contact will cause the gate assembly to undergo reverse directional wedging action from movement of the gate assembly between its closed and opened position.

In either of the above undesired situations, dragging of the seals against the wedging gate assembly, if unable to push the seals outwardly, can produce excessive stem torque and resultant parts wear even to lock the valve in some intermediate position (not opened or closed). Thus, the valve becomes useless for its intended purposes.

SUMMARY OF THE INVENTION

In accordance with this invention, there is provided an improvement to gate valves of the through conduit type having a double expanding gate assembly and metal sealing rings that can float inwardly against the smooth faces of the gate element and segment. The gate assembly in a collapsed condition has a minimum dimension between its smooth faces while in an expanded condition has a maximum dimension with these faces engaging the sealing rings. This gate valve is provided the improvement by gate assembly control means integral with the gate assembly for restraining metal-to-metal engagement of the sealing rings against the parallel smooth faces of the gate element and segment in their collapsed condition during movements between opened and closed positions.

DESCRIPTION OF THE DRAWINGS

FIG. 2 is a partial horizontal section taken along line 2—2 of the valve shown in FIG. 1;

FIG. 3 is an elevation of the gate assembly along line 3—3 from the valve of FIG. 2;

FIG. 4 is a partial section of elastic suspension elements taken along line 4—4 of the gate assembly shown in FIG. 3;

FIG. 5 is a partial section, like FIG. 4, of another type of elastic suspension element;

FIG. 6 is a partial section, like FIG. 5, of another type of elastic suspension element;

FIG. 7 is a partial section, like FIG. 5, of another type of elastic suspension element;

FIG. 8 is a partial section taken along line 8—8 of the elastic suspension element shown in FIG. 7;

In these drawings, the several embodiments have common elements of construction. In this regard, the several figures will designate like elements with like numerals to simplify the present description.

DESCRIPTION OF PREFERRED EMBODIMENT

Figure 1:
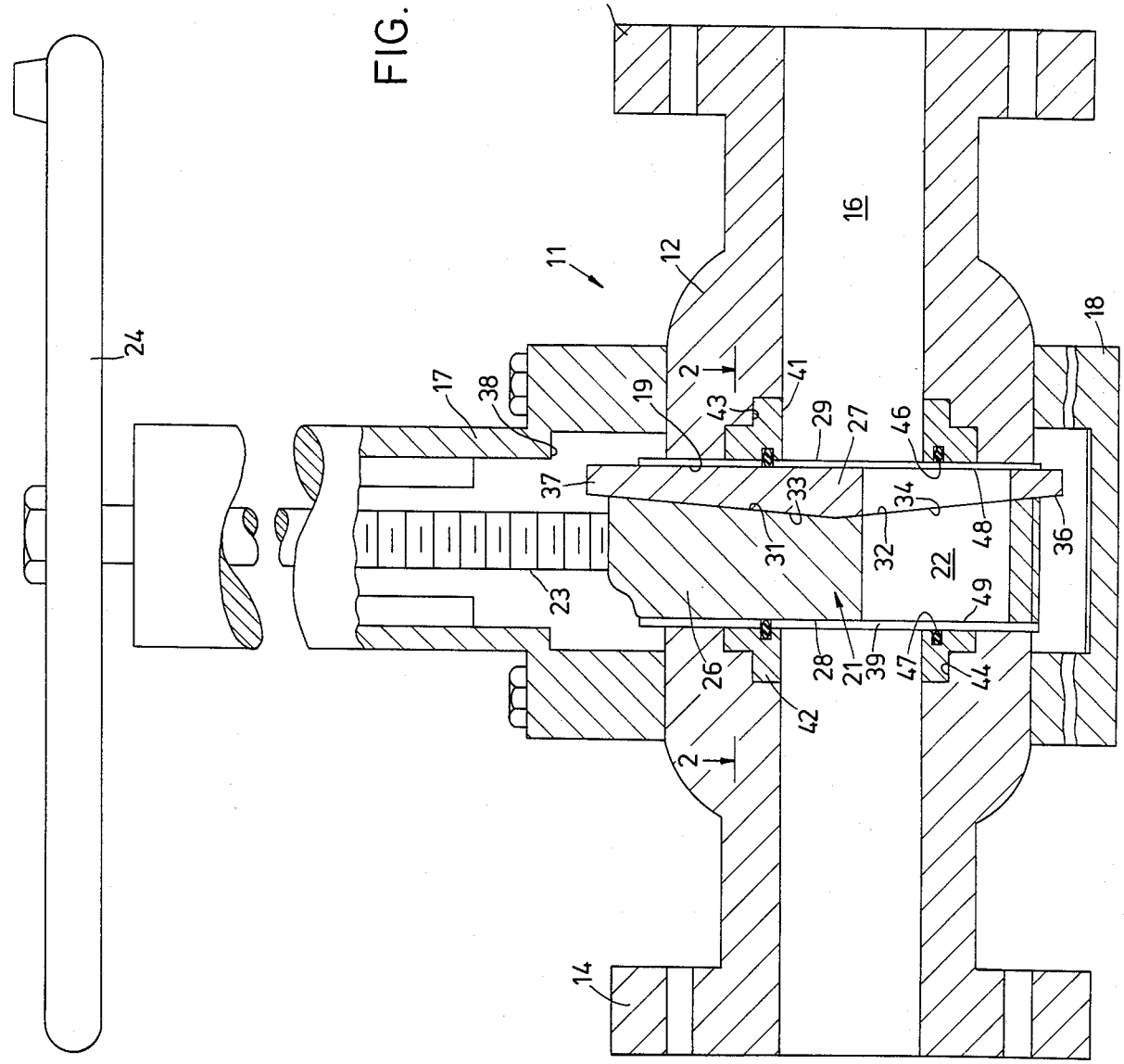
FIG. 1 is a vertical section through a non-rising stem through conduit gate valve with a double expanding gate assembly provided with the improvement of this invention.

Referring now to FIG. 1, there is shown a gate valve 11 of the through conduit type with a double expanding gate assembly carrying the present invention. The valve 11 has a body 12 with end flanges 13 and 14, and a longitudinal flow passage 16. A bonnet 17 and cap or cover 18 are mounted onto the body 12.

The body 12 has an obround chamber 19 transverse to the flow passage 16. A gate assembly 21 is positioned within the chamber 19 and mounted for movement (downwardly) into a closed position. The gate assembly is shown during movement from the opened position where its opening 22 was aligned with the flow passage 16.

The gate assembly 21 is moved between selected positions by a threaded mounting to stem 23. The stem 23 is journaled within the bonnet 17 for rotation by the handwheel 24 but restrained against axial movement by a collar (not shown).

The metal gate assembly 21 includes a gate element 26 and a segment 27. The stem 23 threads axially into the gate element 26. The gate element and segments have parallel smooth faces 28 and 29, respectively. The gate element 26 has a vee recess formed of surfaces 31 and 32, and this recess receives the complementary vee surface 33 and 34 of the segment 27. The segment 27 has ends 36 and 37 extending axially beyond the gate element 26. When the gate assembly 26 moves into the closed position, the end 36 abuts the cap 18 and the gate element 26 slides along surfaces 31 and 33 to bring the gate assembly into its expanded condition. Likewise, when the gate assembly moves into the opened position, end 37 abuts a shoulder 38 in the bonnet. As a result, the gate element slides along surfaces 32 and 34 and again is placed into the expanded condition.

The body 12 carries sealing rings 41 and 42 mounted firmly in complementary recesses 43 and 44. However, the sealing rings could have a true "floating mounting" for ready movements towards the gate assembly 21. The metal sealing rings carry annular resilient rings 46 and 47 which extend beyond their faces 48 and 49. When the gate assembly 21 is in the expanded conditions with its maximum thickness dimension, its surfaces 28 and 29 rest against faces 48 and 49 of the sealing rings. At this time, the rings 46 and 47 produce the desired fluid seal about the flow passage 16 and against the gate element 26 and segment 29.

The gate assembly 21 is shown in the drawings in its collapsed condition with a minimum dimension between the sealing rings 41 and 42. A small space 39 exists between the smooth faces 28 and 29 of the gate assembly and the faces 48 and 49 of the sealing rings. Although this space is usually less than 20 thousanths of an inch, the sealing rings can move inwardly into the gate assembly, especially if they are of the "floating" type. Under these conditions, problems with the gate assembly suffering binding and wedging can occur.

The present invention provides structures for the gate assembly that keep the sealing rings from moving inwardly sufficiently to bind or wedge by metal-to-metal contact the gate assembly while simultaneously returning the gate assembly into the collapsed condition during movement between the opened and closed positions.

Turning now to FIGS. 2 and 3, the gate assembly 21 carries on the parallel edges 51 and 52 of the gate element 26, metal guide strips 53 and 54. The strips can be rectangular and are positioned to ride in metal-to-metal contact at their edges 56–59 against faces 48 and 49 of the sealing rings. The strips have a dimension between their edges 57 and 58–59 that is greater than the minimum thickness dimension but less than the maximum thickness of the gate assembly 21 in its collapsed and expanded conditions, respectively. As a result, the gate assembly in its collapsed condition will not suffer binding or wedging because the strips keep the sealing rings 41 and 42 from metal-to-metal contact with the smooth faces 28 and 29 of the gate assembly during movement between its open and closed positions. However, the gate assembly in the expanded condition can press directly against the faces of the sealing rings.

The strips have a minimum side dimension from the gate assembly, and this dimension is less than the spacing occupied by the oxbow spring and lugs of the conventional gate valve.

The guide strips 53 and 54 are mounted to the gate assembly by elastic suspension elements that bias the assembly into the collapsed condition but permit adequate movement between the gate element 26 and segment 27 for proper wedging action against the sealing rings 41 and 42.

These elastic suspension elements in one embodiment include threaded fasteners 61–63 which are threaded into the gate element 26 and segment 27. These fasteners are received in slightly larger apertures leaving an annulus 64. An elastic member 66 is confined in the annulus 64 between the guide strip and fastener. For example, the elastic member 66 can be an o-ring, a wafer spring or like elastic element that undergoes deformation sufficiently to allow axial movement of the gate element and segment for proper wedging and for returning them into the collapsed condition during movement of the gate assembly. For example, the 0.25 inch thick o-ring of Buna-N rubber with a durometer hardness of 60 shore can be used.

If desired, a metal wafer spring arrangement can be used for the elastic element. In FIG. 5, the guide strips are provided with cylindrical apertures 67. A capped stud 68 threads into the gate element 26 or segment 27 and centers a convoluted or wafer spring 69 in the aperature. As a result, the spring allows relative axial movement between the gate element and segment but always returns them to collapsed condition during movement.

In FIG. 6, there is shown an elastomer element usable in place of the elastic member 66 and spring 69, but with the cylindrical aperature 71. An elastomer, such as a synthetic rubber annular member 72 is bonded into the guide strips, and also to a metal ferrule 73. A flat head machine screw 74 is threaded through the ferrule 73 into the gate element 26. With this arrangement, the annular member 72 may be compressed during wedging of the gate assembly but always returns it positively into the collapsed position during movement between the closed and opened positions.

In FIGS. 7 and 8 are shown dual helical springs 76 and 77 that are formed integral at their outer ends 78 and 79 with the guide strips and at their inner ends 81 and 82 with a collar 83. A cap bolt 84 passes through the collar 83 and threads into the gate element 26.

These dual helical springs allow ready movement between the gate element and segment during wedging action of the gate assembly into its expanded condition. However, these springs 76 and 77 return the gate assembly 21 into collapsed state when the gate assembly is moving between its opened and closed positions.

Referring again to FIG. 2, the guide strips 53 and 54 and provided guideways to insure proper travel of the gate assembly 21 during movement between its opened and closed positions. The guide strips carry stepped surfaces 86–89 adjacent their edges 56–59. These stepped surfaces cooperate in accurately guiding the gate assembly with shoulders 91–94 formed into the curved ends of the chamber 19 and the faces 48 and 49 of the seals.

From the foregoing, it will be apparent that there has been provided an improved through conduit gate valve with double expanding gate assembly which avoids the problems of binding and wedging. It will be appreciated that certain changes and alterations in the present valves may be made without departing from the spirit of this invention. These changes are contemplated by and are within the scope of the appended claims which define this invention. Additionally, the present description is intended to be taken as an illustration of this invention.

What is claimed is:

1. In a gate valve having a body with a valve chamber intersecting a flow passage, an expanding metal gate valve assembly mounted for movement in the body and within the chamber between opened and closed positions across the flow passage, the gate assembly comprised of a gate element and a segment having smooth parallel faces for engaging metal backed sealing rings mounted in recesses in the body about the flow passage, the gate element having a vee recess and the segment having a complementary vee face fitted into this recess with the gate element and segment in a collapsed condition for providing a minimum dimension between their parallel faces, whereby the gate assembly moves in collapsed condition between opened and closed position and is actuated into a substantially expanded maximum dimension between these parallel faces for tightly engaging the sealing rings at the opened and closed position, the improvement comprising:

(a) gate assembly control means integral with the gate assembly for restraining metal-to-metal engagement of the sealing rings against the parallel face of the gate element and segment in their collapsed condition during movements between opened and closed positions;

(b) said gate assembly control means in said gate assembly having a parallel edge aligned with the axis of movement between opened and closed positions, metal guide strips mounted on said edges and positioned to ride in metal-to-metal contact with said sealing rings and said metal guide strips having a thickness of a dimension greater than the minimum dimension but less than the maximum dimension of said gate assembly in its collapsed and expanded conditions, respectively; and (c) in said gate assembly, said gate element and segment mount said metal guide strips to said edges of said gate element and said segment by elastic suspension means, and said elastic suspension means biasing said gate element and said segment into the collapsed condition during movement of said gate assembly between opened and closed positions.

2. The gate assembly control means of claim 1 wherein said elastic suspension means includes fasteners secured within said gate element and said segment and extending through openings in said metal guide strips, and elastic members surround said fasteners within said apertures.

3. The gate assembly control means of claim 2 wherein said fasteners have tapered head portions and said apertures have complementary tapered enlargements, and said elastic members surround tapered head portions of said fasteners.

4. The gate assembly control means of claim 2 wherein said elastic members are bonded rubber mounts within said apertures of said metal guide strips.

5. The gate assembly of claim 2 wherein said elastic suspension means is a rubber O-ring seated in said apertures and surrounding said fasteners.

6. The gate assembly of claim 2 wherein said elastic suspension means is an annular spring seated in said apertures and surrounding said fasteners.

7. The gate assembly of claim 6 wherein said elastic suspension means is a helicoidal spring surrounding at one terminus said fasteners in said apertures and secured to said metal guide strips at its other terminus.

* * * * *